J. E. ROBBINS.
HOG FEEDER.
APPLICATION FILED APR. 19, 1917.

1,257,399.

Patented Feb. 26, 1918.
2 SHEETS—SHEET 1.

WITNESSES:
Frank A. Fahle
Josephine Gasper

INVENTOR
John E. Robbins,
BY
Hood & Schley
ATTORNEYS

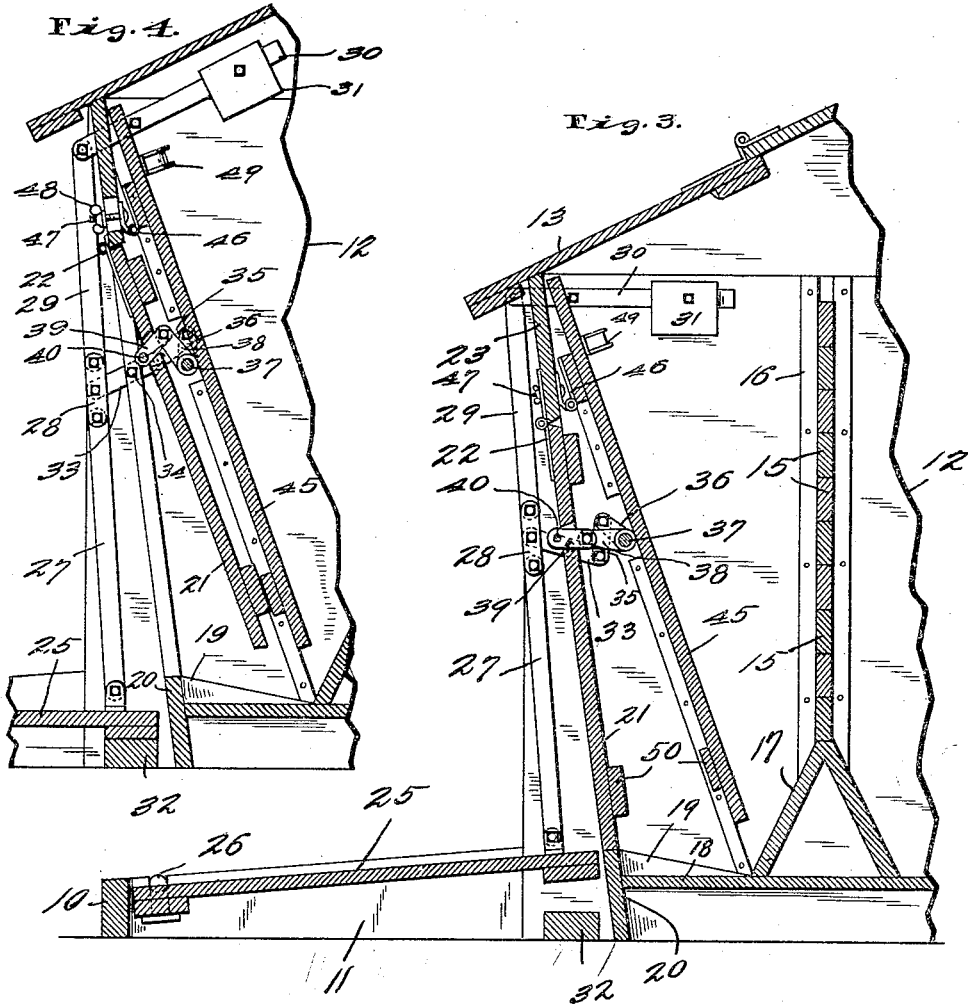

UNITED STATES PATENT OFFICE.

JOHN E. ROBBINS, OF GREENSBURG, INDIANA.

HOG-FEEDER.

1,257,399.   Specification of Letters Patent.   Patented Feb. 26, 1918.

Application filed April 19, 1917. Serial No. 163,118.

*To all whom it may concern:*

Be it known that I, JOHN E. ROBBINS, a citizen of the United States, residing at Greensburg, in the county of Decatur and State of Indiana, have invented a new and useful Hog-Feeder, of which the following is a specification.

It is the object of my invention to provide an automatic hog feeder, whereby the hogs can get as much feed as they require, but are prevented from wasting it; whereby the food is protected from the weather; and whereby clogging up of the device is prevented.

Figure 1:
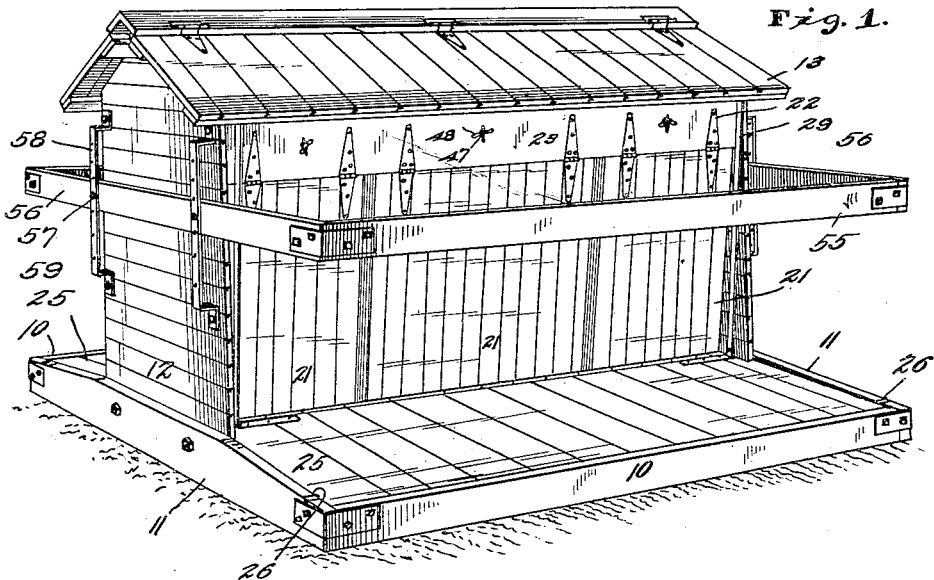
Figure 2:
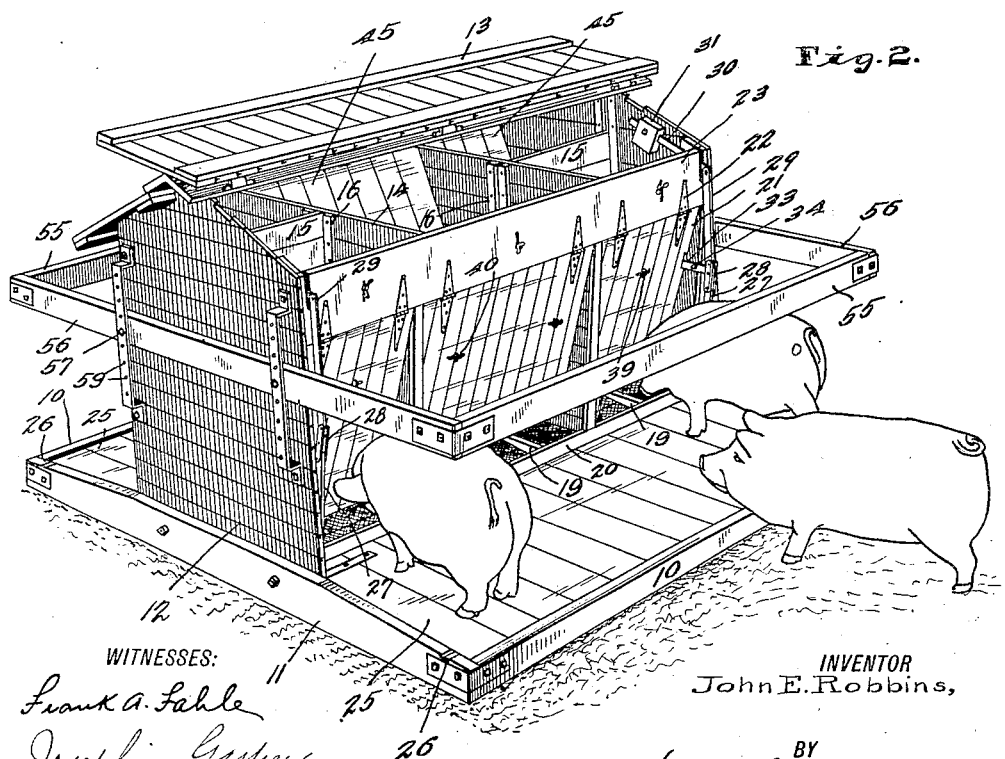

The accompanying drawings illustrate my invention. Figure 1 is a perspective view of a hog feeder embodying my invention; Fig. 2 is a similar view, showing one section of the cover raised and several hogs feeding;
Fig. 3 is a partial transverse vertical section through such hog feeder, with the feeding door closed; and Fig. 4 is a similar partial transverse vertical section, but with the feeding door open.

The base frame comprises longitudinal members 10 and transverse members 11, and mounted on this base frame is a storage bin 12 extending from one transverse base member 11 to the other midway between the two longitudinal members. This bin is preferably provided with a gable roof, of which parts are mounted on hinges to provide covers 13 which can be lifted to permit supplying feed thereto. The bin may be divided into a number of sections by transverse partitions 14, which are preferably permanently mounted in place, and the transverse spaces thus formed may be divided by medial longitudinal partitions, which are preferably removably mounted in place, as by being formed of a vertical series of boards 15 mounted in vertical slide-ways 16. The lower ends of the series of boards forming the partitions 15 rest on an inverted V-shaped partition 17, the parts of which act as deflectors to throw the grain at the bottom of the bin toward the feed opening on each side along the bin floor 18. On this floor 18 at each side there are a series of cleats 19 parallel to the transverse partitions 14 to prevent the hogs from rooting lengthwise of the feeding openings of the bins and thereby throwing the corn out and wasting it. At the front edge of the cleats 19 at each side there is a bottom board 20 set on edge and extending from one end of the bin 12 to the other. Coöperating with the upper edge of each bottom board 20 are the lower edges of a series of swinging doors 21, which are hung by hinges 22 from the lower edge of a top board 23 also extending from one end of the bin 12 to the other. When the doors 21 are swung inward, the grain behind the bottom board 20 and between the cleats 19 becomes accessible to the hogs.

In order to obtain the swinging of the doors 21 automatically, a pivoted platform 25 is mounted between each bottom board 20 and the adjacent longitudinal base 10, these platforms being mounted on pivot pins 26 mounted in the transverse base members 11 close to the longitudinal base members 10, so that the edges of such platform 25 which are toward the bottom boards 20 may swing up and down. Each platform 25 is connected at each end near its inner edge to the bottom of a vertical series of links 27—28—29, the top of which series is connected to a lever 30 carrying a counterweight 31, the weight of which tends to raise the inner edge of the platform 25, to the position shown in Fig. 3. However, the excess of weight in the counterweight 31 is relatively slight, so that when a hog steps upon the platform 25 the weight of the hog will cause the platform to swing downward and the counterweight 31 to be raised, to the position shown in Fig. 4, the downward movement of the inner edge of the platform 25 being limited by its engagement with a stop member 32 extending from one transverse base member 11 to the other. When the hog steps off of the platform, the counterweight 31 returns it to the normal position shown in Fig. 3. Each link 28 is connected at an intermediate point to one end of a lever 33 mounted on a pivot bolt 34 in the end wall of the bin 12, the other end of such lever 33 being connected by links 35 to arms 36 on shafts 37 mounted in the end walls of the bin 12 and in the partitions 14 and extending from end to end of the bin. The lever 33 and the link 35 form an operating toggle which is straightened to open the associated door. There are two of these rods 37, one for each series of doors 21 along each side. Each shaft 37 carries a series of arms 38, one or more for each associated door 21, which arms 38 are connected to links 39 pivoted to the doors 21, as on staples 40. By this connection, when the platform 25 swings downward the levers 33 are turned from the position shown in Fig. 3 to that shown in Fig. 4, thereby turning the shaft 37 so that through the arms 38 and links 39 the doors 21 are swung inward to the position shown in Fig. 4. The platform on each side operates all the doors 21 on that side, but it and its associated doors are independent in their operation of the platform and doors on the other side of the bin. Thus when a hog steps on either platform 25, all the feed doors 21 on that side of the bin are opened, and he can obtain food from any of the spaces provided by the partitions 14. When the doors 21 are closed each associated arm 38 and link 39, which form a toggle, are substantially in a straight line so that the doors 21 cannot be opened by direct pressure against them and cannot be blown open, but require that the associated platform be depressed in order to open them. Thus the toggle formed by the lever 33 and link 35 and the toggle formed by the arm 38 and link 39 operate oppositely, the first being straightened and the second collapsed when the associated door is opened and the second being straightened and the first collapsed when such door is closed.

In order to prevent clogging up of the bin, I preferably provide behind each door 21 a slanting partition 45, which slants backward at its lower edge toward the medial partition 15. Each partition 45 is mounted on hinges 46 carried by the top board 23, which hinges are preferably held in place by bolts 47 provided with butterfly nuts 48 so that by removing such butterfly nuts the partitions may be removed if desired, handles 49 being provided on their inner faces for that purpose. The adjacent faces of the doors 21 and partitions 45 are provided near their lower edges with bumpers 50, which strike each other when the doors 21 are swung open by the depression of the platform 25 when a hog steps upon it, thus producing a sudden jarring of the partitions about the axis of the hinge 46, to agitate the feed behind such partitions, thereby preventing clogging. The rooting of the hogs against the doors 21 when feeding also causes more or less jarring of the partitions 45.

In order to prevent larger animals from molesting the feeder, I provide a guard rail composed of longitudinal members 55 and transverse members 56, of such height that the hogs can pass beneath it but larger animals such as cows and horses are prevented from stepping on the platform 25 or reaching the feed behind the bottom boards 20. This guard rail is preferably vertically adjustable, as by having its two transverse members attached by bolts 57 to irons mounted on the ends of the bin 12 and each provided with a vertical series of holes 59 with any one of which the corresponding bolt 57 may be made to coöperate.

The operation is already clearly apparent; when a hog steps on either platform 25, his weight causes it to swing downward until stopped by the stop member 32, thereby causing the associated doors 21 to swing inward so that the hog can have access to the feed behind the bottom board 20. The swinging in of the doors 21 jars the partitions 45 so as to cause more feed to be jarred down into the space behind such bottom board. When the hog is through feeding, and steps off the platform 25, the counterweight 31 returns the doors 21 to closed position.

I claim as my invention:

1. A feeding device, comprising a movable platform operable downward by the weight of an animal but tending to move upward, a feed bin provided with an inwardly opening door swinging on a horizontal axis, connections between said door and said platform so that the door is swung open when the platform is depressed, and a partition movably mounted behind said swinging door so that it is struck by the swinging door when it is opened and jarred thereby so as to prevent clogging of the feed in the bin.

2. A feeding device, comprising a movable platform operable downward by the weight of an animal but tending to move upward, a feed bin provided with an inwardly opening door swinging on a horizontal axis, connections between said door and said platform so that the door is swung open when the platform is depressed, a member on which said door is hinged on a horizontal axis, a partition behind such door so as to be struck and jarred by the door when the door is opened, and hinges on which said partition is mounted to swing on a horizontal axis, said hinges being mounted on said member.

3. A feeding device, comprising a feed bin provided with a swinging door, means accessible to and operable by small animals for producing opening of such door so that such animals can obtain feed, said door being locked against operation otherwise than by said means, and a guard rail at such height that it permits small animals to have access to said door-operating means but prevents larger animals from having such access.

4. An animal feeding device for smaller animals, comprising a movable platform operable downward by the weight of an animal but tending to move upward, a feed bin provided with a swinging door, connections between said door and said platform so that the door is swung open when the platform is depressed, and an open guard rail preventing larger animals from stepping on said platform.

5. A feeding device, comprising a feed bin provided at the side with a feed door swinging on a horizontal axis, a movable platform operable downward by the weight of an animal but tending to move upward, and connections between said door and said platform so that the door is swung open when the platform is depressed, said connections including a toggle, the two parts of which are substantially in alinement when the door is closed.

6. A feeding device, comprising a feed bin provided at the side with a feed door swinging on a horizontal axis, a movable platform operable downward by the weight of an animal but tending to move upward, a shaft which is rotated by the movement of said platform, an arm on said shaft, and a link connecting said arm with said door, so that when the platform is depressed the shaft is turned and the door is opened, said arm and link comprising a toggle which is substantially in alinement when the door is closed.

7. A feeding device, comprising a feed bin provided at the side with a feed door swinging on a horizontal axis, a movable platform operable downward by the weight of an animal but tending to move upward, a shaft which is rotated by the movement of said platform, an arm on said shaft, and a link connecting said arm with said door and forming a toggle with said arm, so that when the platform is depressed the shaft is turned and the toggle is collapsed to open said door and when the platform is moved to its upper position the toggle is straightened to lock the door closed.

8. An animal feeding device for smaller animals, comprising a movable platform movable downward by the weight of an animal but tending to move upward, a feed bin provided with a swinging door, connections between said door and said platform so that the door is swung open when the platform is depressed, said connections including means for preventing the opening of the door by direct pressure against the door, and an open guard rail for preventing larger animals from stepping on to said platform.

9. A feeding device, comprising a feed bin provided at the side with a feed door swinging on a horizontal axis, a movable platform operable downward by the weight of an animal but tending to move upward, a shaft, connections between said platform and said shaft including a toggle, and connections between said shaft and said swinging door including a toggle, said two toggles being arranged so that they work oppositely upon movements of the platform.

In witness whereof I, JOHN E. ROBBINS, have hereunto set my hand, at Greensburg, Indiana, this 11th day of April, A. D. one thousand nine hundred and seventeen.

JOHN E. ROBBINS.

Copies of this patent may be obtained for five cents each, by addressing the "Commissioner of Patents, Washington, D. C."